United States Patent [19]
Appelblom et al.

[11] 3,882,682
[45] May 13, 1975

[54] FLOATING BOOM WITH DEMOUNTABLE FLOATS

[76] Inventors: Harold R. Appelblom, 2310 Carlmont Dr., Belmont, Calif. 94002; Francois Emile de Bourguignon, 1269 Ridgeley Dr., Campbell, Calif. 95008

[22] Filed: Apr. 16, 1973

[21] Appl. No.: 351,519

[52] U.S. Cl. .......................................... 61/1 F; 61/5
[51] Int. Cl. ............................................ E02b 15/04
[58] Field of Search ........ 61/1 F, 1, 5; 210/DIG. 21, 210/242

[56] References Cited
UNITED STATES PATENTS

| | | | |
|---|---|---|---|
| 3,537,587 | 11/1970 | Kain | 61/1 F X |
| 3,645,099 | 2/1972 | Saavedra | 61/1 F |
| 3,731,491 | 5/1973 | Markel et al. | 61/1 F |
| 3,739,584 | 6/1973 | Belin | 61/1 F |

Primary Examiner—Philip C. Kannan
Attorney, Agent, or Firm—Warren, Rubin & Chickering

[57] ABSTRACT

A floating boom is disclosed which includes an elongated sheet-like partition member and a plurality of float means including float elements demountably secured to the partition member in relatively spaced apart positions thereon. The float elements are formed for rapid and easy attachment to frame members of the float means, which frame members are relatively permanently secured at predetermined positions along the length of the partition. The float elements are secured to the frame by arms which provide an outrigger type construction to enhance the stability of the boom and provide a channel between the float elements and the partition. Latch means is provided to enable selective coupling of the arms to the frame members.

7 Claims, 7 Drawing Figures

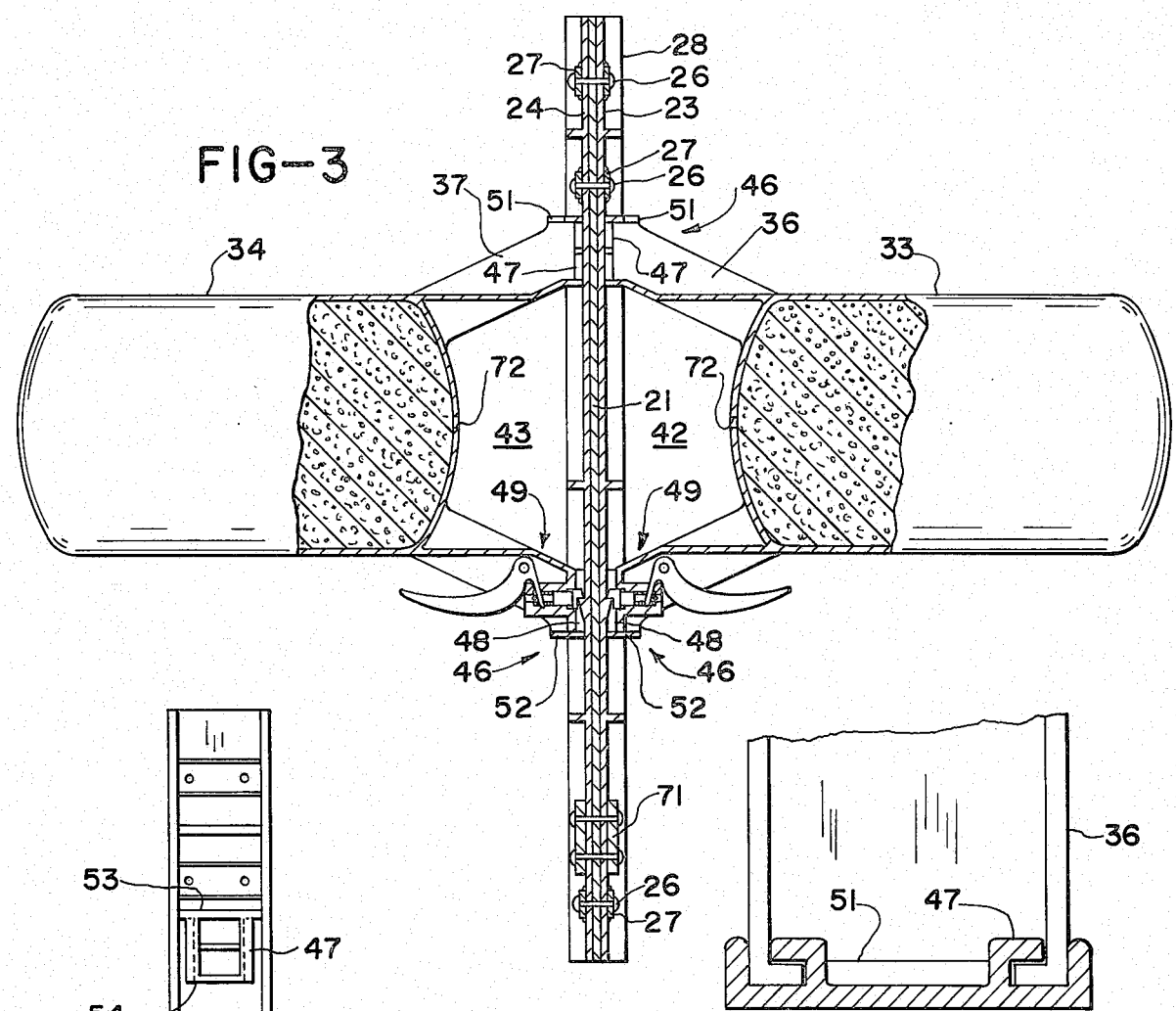
FIG-3
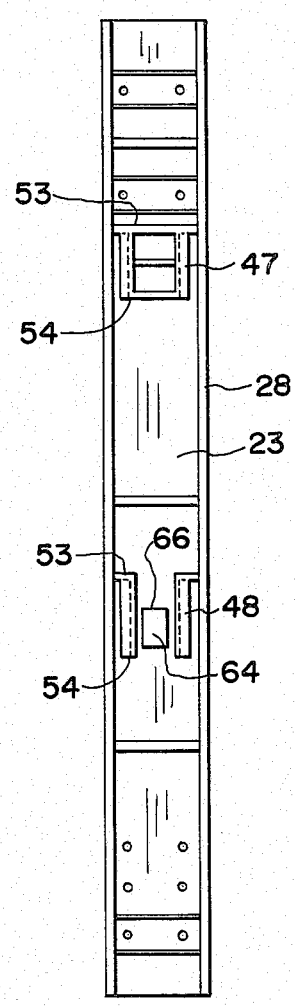
FIG-7
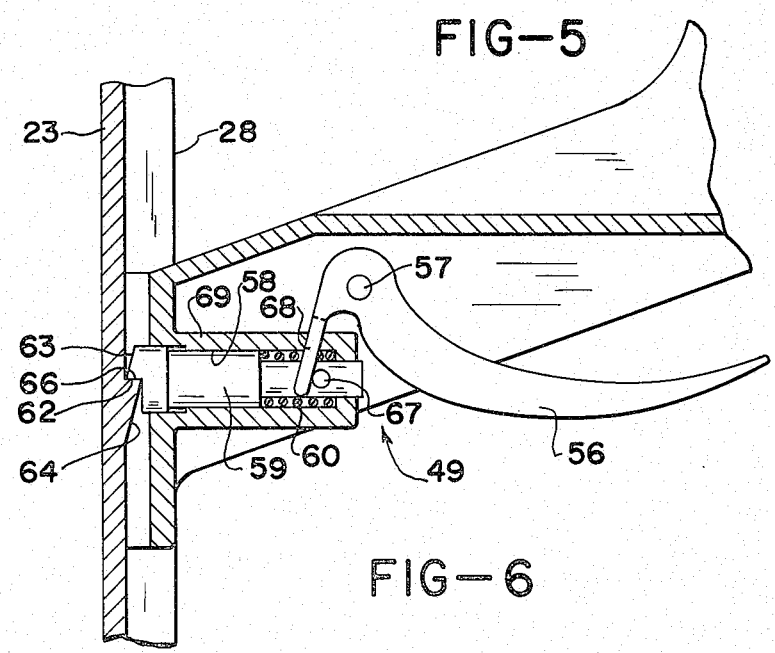
FIG-5
FIG-6

FLOATING BOOM WITH DEMOUNTABLE FLOATS

BACKGROUND OF THE INVENTION

In recent years substantial attention has been directed to the problem of controlling and picking up liquid pollutants which have been accidentally discharged into bodies of water. Part of this effort has been directed toward the development of an effective floating boom which can be used to control the liquid pollutant, such as oil, during the time in which the pollutant is being skimmed from the water surface, absorbed, coagulated, etc.

Several types of floating booms have been developed as part of pollution control systems. One floating boom is shown in U.S. Pat. No. 3,499,290 and is formed of a buoyant cylindrical section to which a weighted flexible skirt or partition member is secured. A similar inflatable boom is set forth in U.S. Pat. No. 3,476,246. U.S. Pat. No. 3,499,291 discloses a floating boom in which a partition material is stretched over a framework to which floats are attached. Floating booms have been devised in which the float members are substantially permanently attached to an elongated partition member through openings positioned along the length of the partition, as is shown in U.S. Pat. No. 3,537,587. While having certain advantages these prior floating booms have been found to lack certain other desirable features. Accordingly, a floating boom has more recently been devised which employs an elongated sheet-like partition and a plurality of float means demountably secured to the partition at relatively spaced apart positions thereon. This type of floating boom is broadly set forth and shown in a co-pending patent application entitled "FLOATING BOOM" and filed by Neeld D. Tanksley. In this co-pending application the demountable float means are permanently secured to a frame which can be selectively mounted and demounted from the partition. As is the case in the present invention, the float elements of the co-pending application are preferably mounted on arms which space the float elements at a distance from the partition to enhance the stability of the floating boom and enable the passage of oil, water and debris between the float elements and the partition.

It is an object of the present invention to provide a floating boom in which an alternative manner of connecting the float elements to the partition is provided.

It is another object of the present invention to provide a floating boom which may be rapidly deployed and retrieved.

It is another object of the present invention to provide a floating boom which is easy and inexpensive to manufacture, relatively impervious to pollutants, and constructed in a manner allowing interchangeability of parts.

Other objects and features of advantage of the floating boom of the present invention are set forth in detail in or will become apparent from the following description and accompanying drawing.

SUMMARY OF THE INVENTION

The floating boom of the present invention includes a sheet-like partition member or barrier to which a plurality of float means are demountably attached. The float means include a frame and float elements, and the improvement of the present invention is briefly comprised of the frame of the float means being relatively permanently mounted to the partition member and the floats being demountably coupled by coupling means to the frame. The coupling means include mating cleats on the frame and an arm carrying the float element, latch means between the arm and frame, and a manually engageable handle for release of the float elements. The mating cleats and latch means are preferably formed so that buoyant and gravity forces cooperate to maintain the float elements coupled to the frame.

BRIEF DESCRIPTION OF THE DRAWING

FIG. 3 is an end cross-sectional view taken along the plane of line 3—3 of FIG. 2 and partially broken away.

FIG. 5 is an enlarged, fragmentary, cross-sectional view taken along the plane of line 5—5 of FIG. 2.

FIG. 6 is an enlarged, fragmentary, cross-sectional view of a latch means employed in the boom of the present invention.

FIG. 7 is a side elevational view of a frame member constructed in accordance with the present invention with the float removed.

DESCRIPTION OF THE PREFERRED EMBODIMENT

Figure 1:
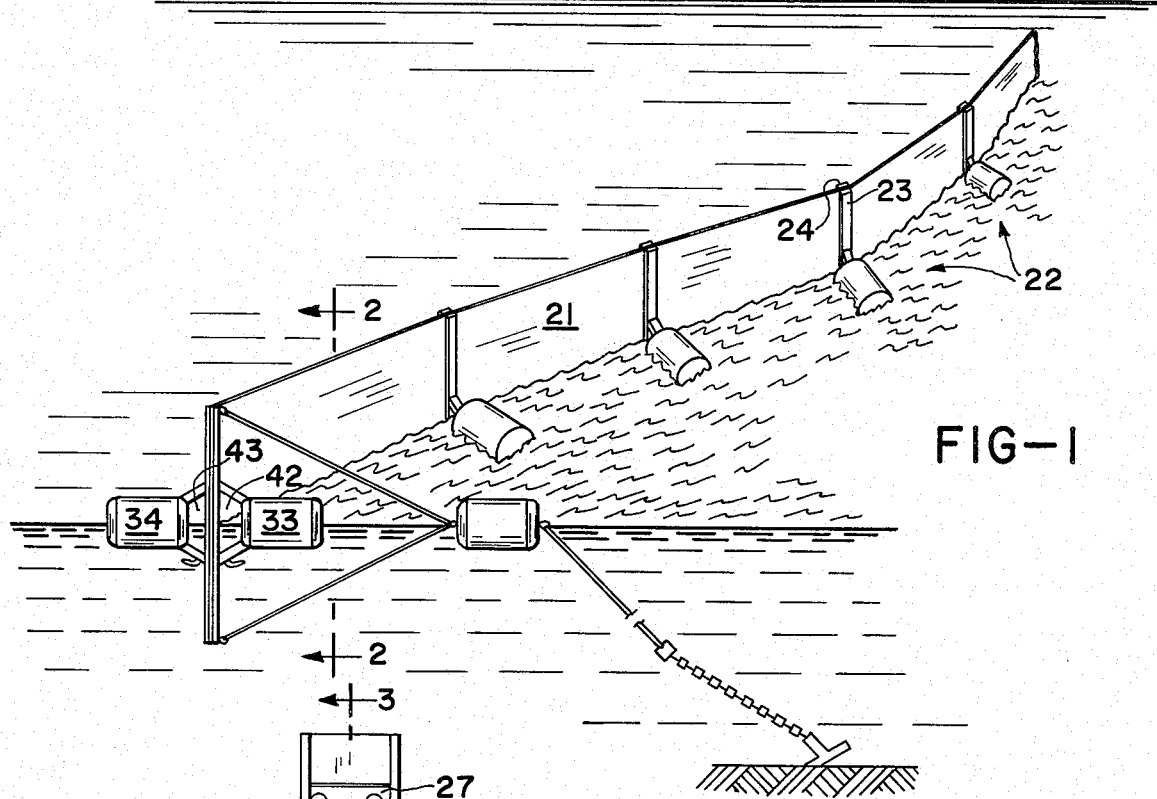
FIG. 1 is a top perspective view of a floating boom constructed in accordance with the present invention and deployed in a body of water.
Figure 2:
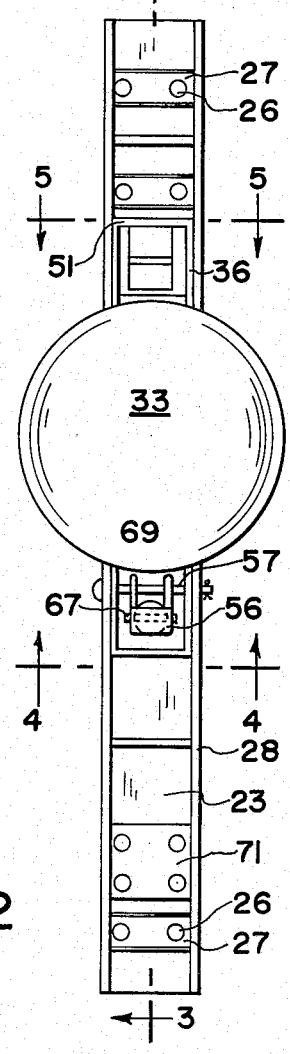
FIG. 2 is an enlarged side elevational view taken along the plane of line 2—2 of FIG. 1.

Referring now to the drawing, the floating boom of the present invention can be seen to be comprised of a sheet-like barrier or partition member 21 and a plurality of float means, generally designated 22, demountably secured to the partition at relatively spaced apart positions thereon. Float means 22 preferably are formed with a frame, in this case a pair of juxtaposed upright frame members 23 and 24, and at least one float element, and in this case a pair of float elements 33 and 34, mounted on arms 36 and 37 extending from frame members 23 and 24. Arms 36 and 37 position the float elements from partition 21 to define spaces or channels 43 and 44 for the passage of oil, water, debris, etc. between the float elements and the barrier. Additionally, the positioning of float elements at a spaced distance from the partition creates an outrigger effect enhancing the stability of the boom in water. Frame members 23 and 24 are preferably relatively thin, that is, they do not extend over a substantial portion of the length of partition 21, so that when combined with a relatively flexible partition, such as is provided by a fiber reinforced rubber or plastic belting, the floating boom will flex and undulate in a manner accommodating wave action and swells without unduly stressing the boom.

As thus far described, the floating boom of the present invention has the same or analogous structure and features of advantage as are contained in the floating boom set forth in detail in the above referenced co-pending United States patent application. In order to provide an alternative method for attachment of the floating elements to the partition, the improvement of the present invention is comprised of relatively permanently mounting upright frame members 23 and 24 to partition 21 by fasteners such as rivets or bolts 26 which pass through frame members 23 and 24 and the partition. Since frame members 23 and 24 can be advantageously formed of a plastic material which may be injection molded, it is further preferable to provide metallic plates or inserts 27 to spread the bearing load of the rivets over a substantial area of frame members 23 and 24. Thus, bearing plates 27 may be positioned on both sides of partition 21 and outwardly of the frame members to clamp the frame assembly to partition 21. Since the frame members 23 and 24 are relatively permanently affixed to partition 21, the spacing of the frame members along belt or partition 21 must be selected and predetermined in accordance with the buoyancy of the float elements so as to insure floating of the partition at the desired predetermined heighth above the water level. This spacing can be relatively easily determined and for a partition having a heighth of about 24 inches frame members 23 and 24 are fastened to the partition at about every 4 to 5 feet along the length thereof. While affixing a frame to the partition by passing fasteners through the partition decreases the flexibility of location of the float means along the partition, in many applications, it is not necessary to be able to shift the spacing of the float means along the partition.

Since it is highly desirable to be able to remove the float elements and store partition 21 in a roll on a reel or the like, it is desirable that upright frame members 23 and 24 have a thickness dimension which is relatively small. Thus, outwardly protruding flange portions 28 and 29 which effect stiffening of members 23 and 24 can be seen to protrude from the belt or partition only a relatively small distance. Thus, the small thickness dimension of the frame members 23 and 24 enables winding of the belt upon itself on a reel without excessively increasing the diameter of the rolled belting by reason of the permanently affixed frame members.

In order to demountably couple the float elements to the frame members permanently affixed to partition 21, coupling means, generally designated 46, is provided. The coupling means of the present invention is preferably formed for rapid mounting and demounting of the float elements from the frame members. Thus, it is preferable to form coupling means 46 to include an upper cleat 47, lower cleat 48, latch means, generally designated 49, and foot portions 51 and 52 of the bifurcated arms to the float elements. Upper and lower cleats 47 and 48 are formed with a closed upper end 53 and an open lower end 54 dimensioned to slidably receive foot portions 51 and 52 upon placement of the foot portions below the cleats and upward sliding movement of the same to cause simultaneous engagement of the foot portions of the arms by the cleats on the upright frame member.

In order to secure the float element carrying arms to the frame members at the cleats, latch means 49 is preferably formed with a manually engageable handle 56 pivotally mounted about pin 57 to the arm adjacent one of the cleats, in this case lower cleat 48 and foot portion 52. Slidably mounted in bore 58 in the float element carrying arm is a movable latch element 59. Latch means 59 is spring biased by spring 61 for movement outwardly toward the frame member. The outermost end of latch element 59 is formed with a downwardly facing shoulder 62 and a tapered end portion 63. Formed on the upright frame member is an outwardly inclined surface 64 and an upwardly facing shoulder 66. The inner end of latch element 59 is provided with protruding pin 67 which is engaged by extension 68 of handle 56.

In operation, latch means 49 will automatically latch the float element carrying arm to the frame member when the foot portions of the arm are slid upwardly into cleats 47 and 48. Thus, upward motion causes tapered surfaces 63 and 64 to become progressively engaged to inwardly displace latch element 59 against biasing spring 61. Once shoulder 62 passes beyond shoulder 66, the biasing force of spring 61 causes the latch element to snap outwardly and cause the upwardly and downwardly facing shoulders to become interengaged to thereby lock the foot portions in the cleats. In order to remove the float element from the frame member, handle 56 can be engaged and advanced upwardly to cause handle extension portion 68 to move outwardly from the frame element against pin 67. Outward movement of pin 67 displaces latch element 59 against the spring biasing force to disengage shoulders 62 and 66 and permit downward sliding of the foot portions from the cleats for removal of the float element.

Figure 4:
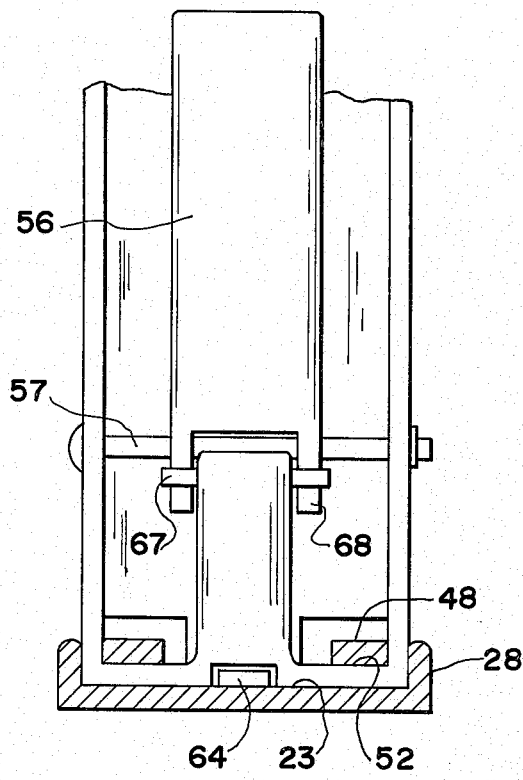
FIG. 4 is an enlarged, fragmentary, cross-sectional view taken along the plane of line 4—4 of FIG. 2.

It will be apparent that latch means 49 can be positioned adjacent foot portion 51 and other forms of latching mechanisms will be suitable for use in the present invention. It is a feature of the present invention that the interfitting cleats and foot portions are formed so that the buoyant force on the float elements and the gravity force on the frame will tend to maintain the cleats and foot portions in interlocked relation even if the latch means should inadvertently fail or become opened. Thus, if a log or piece of debris should cause handle 56 to be upwardly displaced to release the interengaged shoulders, the upward buoyant force on the float element and the downward gravity force on the partition and frame will cause the foot portions to be urged upwardly toward the closed ends 53 of the cleats. As best may be seen in FIG. 4, extension portion 68 is bifurcated and engages the ends of pin 67 which extends outwardly of cylindrical boss 69, which defines bore 58, through a slot 70 (FIG. 6) to enable reciprocation of the latch element.

Instead of employing bifurcated arms 36 and 37, it will be possible to utilize a single unitary arm having a foot portion which interlocks with a cleat formed on the upright frame attached to the partition. This approach would take advantage of the outrigger-type of construction which affords good stability; however, a single arm, unless specially designed, might interfere with the flow of pollutants, debris, etc. between the float elements and partition. It would be possible, however, to design a single arm source to bridge above or below the water surface and maintain a channel or space between the float element and partition for passage of pollutants. Still further, the demountable coupling of the float elements to a frame secured to the partition could be employed to mount the float elements immediately adjacent to the partition. This would eliminate the float channel between the partition and float elements and to some degree reduce the stability accruing from the cantilevered or outrigger mounting shown in the drawing, but for some applications a float channel is not absolutely required and the stability of the boom can be controlled by increasing the float size, if necessary. In this regard it should be noted that it is preferable to provide weight means 71 mounted to upright frame members 22 and 23 adjacent the lower edge of the partition. These weight means can be secured to the frame by rivets or other fasteners passing through the upright frame portions and the partition, and they enhance stability of the floating boom in the water by lowering the center of gravity with respect to the center of buoyancy.

The float elements, including the arms are preferably injection molded from a plastic such as nylon. The float elements themselves may be injection molded as two pieces, with the arm and foot portions forming one piece and the body of the float elements molded as a second piece. The elements may then be joined by heat sealing or adhesives and filled through a port or opening 72 with a closed cell foam such as polystyrene.

In operation the floating boom of the present invention is deployed preferably from a reel (not shown) with a roll of the flexible elongated partition having the frame members secured thereto stored on the reel. At the deployment site, the rolled partition can be unrolled and float elements 33 and 34 coupled to both sides of the partition by sliding the feet of the float element arms up into the cleats of the frame members. As the partition is advanced past an attachment station the float elements are secured to the partition. On retrieval of the boom, the end of the boom may be secured to the reel and then pulled in with each float element being removed as it reaches the attachment and removal station by grabbing handle 56 and squeezing it upwardly while sliding the float elements downwardly to free them from the cleats.

We claim:

1. In a floating boom having a sheet-like partition means and a plurality of float means demountably secured to said partition means at relatively spaced intervals thereon, said float means including a frame member engaging said partition means, a pair of arms mounted to said frame member and extending outwardly therefrom to positions on each side of said partition means, and a float element mounted to each of said arms at a spaced distance from said partition means to define a passageway between said float element and said partition means, the improvement comprising:

said frame member being relatively permanently mounted in engagement with said partition means; and said float means further including coupling means formed as interengaging and mating cleats formed on said frame and foot portions formed on said arms and latch means formed to selectively lock said foot portions and said cleats in interengagement, whereby selective coupling and uncoupling of said float elements to said frame member can be achieved.

2. The floating boom as defined in claim 1 wherein, said cleats and said foot portions are formed to retain said float elements in coupled relation to said frame member in response to the buoyant force on said float elements and the gravitational force on said partition means in the event of failure of said latch means.

3. The floating boom as defined in claim 2 wherein, said cleats are formed with a closed upper end and an open lower end dimensioned for receipt of said foot portions by sliding upward movement of said foot portions from said open lower end to said closed upper end.

4. The floating boom as defined in claim 1 wherein, said latch means comprises a latch element movably mounted to said float element and having a shoulder thereon, a shoulder formed on said frame member and positioned for engagement with said shoulder on said latch element upon seating of said foot portions in said cleats, said shoulder on said frame member being formed to face in a direction opposed to said shoulder on said latch element, and means for displacing said latch element and said shoulder thereon into and out of engagement with said shoulder on said frame member.

5. The floating boom as defined in claim 3 wherein, said means for displacing said latch element is comprised of a manually engageable handle connected for selective displacement of said latch element away from said shoulder on said frame member and spring biasing means formed to urge said latch element toward said shoulder on said frame member.

6. The floating boom as defined in claim 5 wherein, said means for displacing said latch element further includes a pair of oppositely facing tapered surfaces formed for progressive engagement to effect automatic displacement of said latch element during positioning of said foot portions in said cleats.

7. The floating boom as defined in claim 1 wherein, a pair of frame members is provided mounted on opposite sides of said partition means and each of said frame members is formed with a relatively small thickness dimension to enable rolling up said partition means for transportation and storage.

* * * * *

UNITED STATES PATENT OFFICE
CERTIFICATE OF CORRECTION

PATENT NO. : 3,882,682
DATED : May 13, 1975
INVENTOR(S) : Harold R. Appelblom et al.

It is certified that error appears in the above-identified patent and that said Letters Patent are hereby corrected as shown below:

Claim 5, line 1, delete "as defined in Claim 3" and insert therefor ---as defined in Claim 4---.

Signed and Sealed this eighteenth Day of May 1976

[SEAL]

Attest:

RUTH C. MASON
Attesting Officer

C. MARSHALL DANN
Commissioner of Patents and Trademarks